US010254857B2

(12) United States Patent
Winebrand et al.

(10) Patent No.: US 10,254,857 B2
(45) Date of Patent: Apr. 9, 2019

(54) SOFT TOUCH DETECTION OF A STYLUS (71) Applicant: Microsoft Technology Licensing, LLC, Redmond, WA (US)

(72) Inventors: Amil Winebrand, Petach-Tikva (IL); Michael Orlovsky, Rehovot (IL); Dmitry Birenberg, Rosh HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 15/062,127

(22) Filed: Mar. 6, 2016

(65) Prior Publication Data
US 2017/0255282 A1    Sep. 7, 2017

(51) Int. Cl.
G06F 3/041    (2006.01)
G06F 3/0354   (2013.01)
G06F 3/044    (2006.01)

(52) U.S. Cl.
CPC .......... G06F 3/03545 (2013.01); G06F 3/044 (2013.01); G06F 3/0416 (2013.01)

(58) Field of Classification Search
CPC ..................................................... G06F 3/044
See application file for complete search history.

(56) References Cited

U.S. PATENT DOCUMENTS

| 8,414,210 B2 | 4/2013 | Silverbrook et al. |
| 8,477,103 B2 | 7/2013 | Townsend et al. |
| 8,481,872 B2 | 7/2013 | Zachut |
| 8,493,359 B2 | 7/2013 | Wright et al. |
| 8,536,471 B2 | 9/2013 | Stern et al. |
| 8,539,383 B2 | 9/2013 | Zotov et al. |
| 8,547,350 B2 | 10/2013 | Anglin et al. |
| 8,866,767 B2 | 10/2014 | Shahparnia et al. |
| 8,922,530 B2 | 12/2014 | Pance |
| 8,928,635 B2 | 1/2015 | Harley et al. |
| 9,013,429 B1 | 4/2015 | Krekhovetskyy et al. |
| 9,018,547 B2 | 4/2015 | Rimon et al. |
| 9,329,767 B1 | 5/2016 | Teller et al. |
| 9,921,626 B2 * | 3/2018 | Bentov .................... G06F 1/26 |
| 2010/0001962 A1 | 1/2010 | Doray et al. |

(Continued)

FOREIGN PATENT DOCUMENTS

EP    2172834 A2    4/2010
WO    WO 00/63835    10/2000

(Continued)

OTHER PUBLICATIONS

Campbell "Apple Investigating Stylus With Extendable 'Multitouch' Nib, Onboard Light and Motion Sensors", AppleInsider, 6 P., Mar. 20, 2014.

(Continued)

Primary Examiner — Towfiq Elahi (57) ABSTRACT

A method includes detecting a signal emitted by a stylus with a digitizer sensor, determining coordinates of the stylus, identifying a hover operational mode based on input received by the stylus, detecting a capacitive effect of a tip of the stylus on the digitizer sensor and reporting a touch operational mode of the stylus based on the capacitive effect detected. The capacitive effect of the tip of the stylus on the digitizer sensor is based on mutual capacitive detection and is performed in a defined area around the coordinates determined.

20 Claims, 5 Drawing Sheets

(56) References Cited

U.S. PATENT DOCUMENTS

| | | | |
|---|---|---|---|
| 2010/0051356 A1 | 3/2010 | Stern et al. | |
| 2012/0068964 A1 | 3/2012 | Wright et al. | |
| 2012/0154340 A1 | 6/2012 | Vuppu et al. | |
| 2013/0176270 A1* | 7/2013 | Cattivelli | G06F 3/0488 345/174 |
| 2013/0257793 A1 | 10/2013 | Zeliff et al. | |
| 2014/0049478 A1 | 2/2014 | Brunet et al. | |
| 2014/0347311 A1 | 11/2014 | Joharapurkar et al. | |
| 2014/0362035 A1 | 12/2014 | Mo et al. | |
| 2015/0029136 A1 | 1/2015 | Shahparnia | |
| 2015/0035768 A1 | 2/2015 | Shahparnia et al. | |
| 2015/0177868 A1 | 6/2015 | Morein et al. | |
| 2015/0363012 A1* | 12/2015 | Sundara-Rajan | G06F 3/038 345/179 |
| 2016/0154507 A1* | 6/2016 | Bharathan | G06F 3/011 345/174 |
| 2016/0209940 A1 | 7/2016 | Geller et al. | |
| 2016/0306444 A1 | 10/2016 | Fleck | |
| 2017/0131798 A1 | 5/2017 | Geaghan et al. | |
| 2017/0255328 A1 | 9/2017 | Zyskind | |

FOREIGN PATENT DOCUMENTS

| | | |
|---|---|---|
| WO | 2012123951 A2 | 9/2012 |
| WO | 2013165466 A1 | 11/2013 |
| WO | WO 2014/092758 | 6/2014 |
| WO | WO 2014/145872 | 9/2014 |
| WO | 2014188417 A2 | 11/2014 |
| WO | 2015036999 A1 | 3/2015 |

OTHER PUBLICATIONS

Hinckley et al. "Motion and Context Sensing Techniques for Pen Computing", Proceedings of Graphics Interface 2013, GI'13, p. 71-78, 2013.

Hsu et al. "An Inertial Pen With Dynamic Time Warping Recognizer for Handwriting and Gesture Recognition", IEEE Sensors Journal, 15(1): 154-163, Jul. 16, 2014.

Lettner et al. "Heat Maps as a Usability Tool for Multi-Touch Interaction in Mobile Applications", Proceedings of the 11th International Conference on Mobil and Ubiquitous Multimedia, MUM'12, Ulm, Germany, Dec. 4-6, 2012, p. 49-50, Dec. 2012.

Molina-Rueda et al. "Using Heat Maps for Studying User Preferences in Vertical and Horizontal Multi-Touch Surfaces", IEEE 2013 International Conference on Electronics, Communications and Computing, CONIELECOMP, Cholula, Mexico, Mar. 11-13, 2013, p. 21-26, Mar. 2013.

O'Mahony et al. "A Real-Time System for Sensor Information Interactive Visualization With Multi-Touch Technology", 2010 IEEE International Conference on Viral Environments Human-Computer Interfaces and Measurement Systems, VECIMS'10, Taranto, Italy, Sep. 6-8, 2010, p. 141-145, Sep. 2010.

Pinola "Microsoft Patents an Advanced Multi-Touch Stylus", PCWorld, 7 P., May 11, 2015.

Song et al. "Grips and Gestures on a Multi-Touch Pen", Proceedings of the SIGCHI Conference on Human Factors in Computing Systems, CHI'11, Vancouver, BC, Canada, May 7-12, 2011, p. 1323-1332, May 2011.

Vatavu et al. "Gesture Heatmaps: Understanding Gesture Performance With Colorful Visualizations", Proceedings of the 16th International Conference on Multimodal Interaction, ICMI'14, Istanbul, Turkey, Nov. 12-16, 2014, p. 172-179, Nov. 2014.

International Search Report and the Written Opinion dated Jun. 12, 2017 From the International Searching Authority Re. Application No. PCT/US2017/019794. (15 Pages).

"HP Active Pen", Retrieved From: https://store.hp.com/us/en/pdp/hp-active-pen, Retrieved on: Nov. 6, 2015, 8 Pages.

"Final Office Action Issued in U.S. Appl. No. 15/062,124", dated Jul. 3, 2018, 17 Pages.

"Non Final Office Action Issued in U.S. Appl. No. 15/062,124", dated Dec. 22, 2017, 15 Pages.

John, Tony, "Review of E-Touch Pen: A Smart Gadget to Use Windows 8 on Non-Touch Computers", Retrieved From: http://www.techulator.com/resources/9221-Hi-Tech-Solutions-e-Touch-Pen-Reviews.aspx, Mar. 14, 2013, 5 Pages.

"International Search Report and Written Opinion Issued in PCT Application No. PCT/US2017/019793", dated Jul. 26, 2017, 12 Pages.

* cited by examiner

SOFT TOUCH DETECTION OF A STYLUS

BACKGROUND

Digitizer sensors are used for touch detection in many Human Interface Devices (HID) such as laptops, track-pads, MP3 players, computer monitors, and smart-phones. Capacitive sensors are one type of digitizer sensors. The capacitive sensor senses positioning and proximity of a conductive object such as a conductive stylus or finger used to interact with the HID. The capacitive sensor is often integrated with an electronic display to form a touch-screen. Capacitive sensors include antennas or lines constructed from different media, such as copper, Indium Tin Oxide (ITO) and printed ink. ITO is typically used to achieve transparency. Some capacitive sensors are grid based and operate to detect either mutual capacitance between electrodes at different junctions in the grid or to detect self-capacitance at lines of the grid.

Signal emitting styluses, e.g. active styluses, are known in the art for use with a digitizer system. Position of the stylus is tracked by picking on a signal emitted by the stylus with the digitizer sensor. Some active styluses emit a signal that includes information. The information may be pressure applied on the writing tip as sensed by a pressure sensor integrated on the stylus. The digitizer system decodes the information and reports the pressure or the tip status as one of touch and hover based on the decoded information.

SUMMARY

A method for detecting a soft touch of a stylus on a digitizer sensing surface is described. Soft touch as used herein is defined as touch with zero force or near zero force, e.g. less than 15 gm of force or less than 10 gm of force or less than minimum force that is typically detectable by known tip pressure sensors. While providing input with a stylus, a user may apply different levels of pressure. Soft touches may typically occur at initial touchdown of a stylus, at lift-off of a stylus and while operating a stylus at a substantially acute angle with respect to the digitizing surface. Soft touches may also occur when drawing or sketching with the stylus. During these instances, a user may typically expect to see inking. However, soft touches that apply less than a threshold level of pressure on the stylus tip may not be detectable by a pressure sensor associated with the stylus.

According to an aspect of some exemplary embodiments, a sensing method other than sensing with the stylus pressure sensor is applied for detecting soft touches. According to some exemplary embodiments, the additional method is based on capacitive detection of the conductive tip of the stylus with the digitizer system. Typically, this method may be used to detect a near zero force touch or a zero force touch of a stylus tip on the digitizer sensing surface. According to some exemplary embodiments, sensitivity of inking with a stylus may be improved based on the methods described herein. In some exemplary embodiments, the methods described herein may also be applied for detecting soft touch of a handheld device other than a stylus.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

According to some aspects of the present disclosure there is provided a method for a digitizer system to detect when a stylus tip is touching its sensing surface with little or no force. The method may provide improved sensitivity in the soft touch range as compared to sensitivity provided by a pressure sensor embedded in the stylus that senses pressure applied on the stylus tip. Typically, mechanical aspects of known pressure sensors limit its sensitivity at low to near zero pressure. In addition, known tip pressure sensors are typically designed to detect tip movement or force in an axial direction of the tip and therefore such sensors are less sensitive to pressures applied at the tip when the tip is at an angle. According to some embodiments, soft touches of a stylus with a digitizer sensing surface is detected based on a detected capacitive effect of the stylus tip on digitizer sensor. Typically, a mutual capacitive detection method is applied to detect the capacitive effect.

According to some embodiments, contact pressure above a threshold level of pressure is identified based on reports transmitted by a pressure sensitive stylus and contact below the threshold level is identified based on the detecting a capacitive effect of the conductive tip on the digitizer sensor. In some exemplary embodiments, the capacitive effect detection method for detecting the stylus tip is activated while the stylus senses a hover state and is deactivated based on the stylus reporting a touch state.

Due to the relatively small diameter of a stylus tip as compared to pitch of the sensing elements of a digitizer sensor, the capacitive effect of the stylus tip on the digitizer system is small and may only be identified while the stylus tip is touching the sensing surface as opposed to hovering. Once the stylus is lifted off the sensing surface, an air gap between the stylus tip and the sensing surface significantly weakens the capacitive coupling between stylus tip and the sensing surface. The sharp change in the capacitive coupling due to the air gap facilitates differentiating between touch and hover based on the detected capacitive effect.

Even when the stylus is touching the sensing surface, the capacitive effect may be difficult to identify in the presence of a noisy environment. In some exemplary embodiments, a statistical approach based on a pre-defined model of an expected capacitive effect is applied to identify the capacitive effect. In some exemplary embodiment, touch of the stylus is reported based on detecting the capacitive effect with a confidence level above a defined threshold. Since the digitizer system typically tracks location of the stylus based on the signal emitted by the stylus, the location of the stylus is known and the capacitive detection method may be confined to an area around the detected location of the stylus.

In some exemplary embodiments, the digitizer system reports a detected touch mode to a host computer based on which inking is displayed. Improved sensitivity of the digitizer system to low and no force touch may improve the user experience during inking and may also allow the user to operate the stylus at an acute angle with respect to the sensing surface such as when drawing. Optionally, the low or no force touch is specified to the host and the host selects or adjusts the appearance of inking accordingly.

Figure 1:
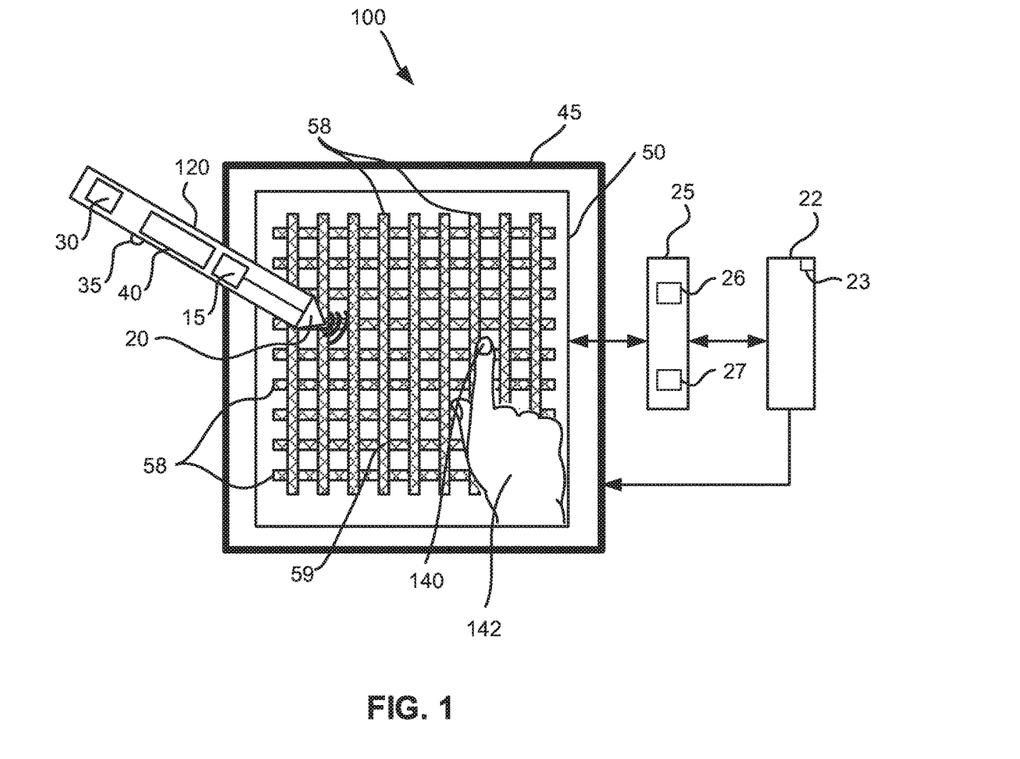
FIG. 1 is a simplified block diagram of an exemplary touch and stylus enabled computing device in accordance with some embodiments of the present disclosure.

Reference is now made to FIG. 1 showing a simplified block diagram of an exemplary touch and stylus enabled computing device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row and column conductive strips 58 forming grid lines of the grid based sensor. Typically, conductive strips 58 are electrically insulated from one another and each of conductive strips is connected at least at on one end to circuit 25, e.g. touch controller. Typically, conductive strips 58 are arranged to enhance capacitive coupling between row and column conductive strips, e.g. around junctions 59 formed between rows and columns. The capacitive coupling formed between the row and column conductive strips is sensitive to presence of conductive and dielectric objects. Alternatively, digitizer sensor formed with a matrix of electrode junctions that is not necessarily constructed based on row and column conductive strips.

According to some embodiments of the present disclosure, conductive strips 58 are operative to detect touch of one or more fingertips 140 or hand 142 or other conductive objects as well as input by stylus 120 transmitting an electromagnetic signal typically via the writing tip 20 of stylus 120. Typically, output from both row and column conductive strips 58, e.g. from two perpendicular axes are sampled to detect coordinates of stylus 120. In some exemplary embodiments, circuit 25 typically includes a stylus detection engine 27 for synchronizing with stylus 120, for processing input received by stylus 120, for tracking coordinates of stylus 120 and/or for tracking pen-up (touch) and pen-down (hover) events. In some exemplary embodiments, stylus 120 includes a pressure sensor 15 associated with tip 20 for sensing pressure applied on tip 20.

In exemplary embodiments of the present disclosure, stylus 120 periodically transmits indication of one of a pen-up or a pen-down state of its tip. Indication is based on output from pressure sensor 15. Typically, a first threshold is defined to differentiate between pen-up and pen-down. Pressure readings below the first threshold are reported as pen-up and pressure readings above the first threshold are reported as pen down. Optionally, due to hysteresis the first threshold may include a pair of thresholds, one threshold for switching from pen-up to pen-down and another threshold for switching between pen-down to pen-up. In some exemplary embodiments, a second threshold on pressure measurements defines when a writing transmission mode is to begin. Typically, the second threshold is defined to be lower than the first threshold so that the accelerated transmission may begin before the first stroke is initiated. According to some exemplary embodiments, during the writing transmission mode, a position signal, e.g. a beacon signal as well as a pressure signal pressure output from the pressure sensor is also transmitted by the stylus.

Input transmitted by stylus 120 may include pressure as well as other information directly related to stylus 120, related to an environment around the stylus 120, to a user using stylus 120, to privileges allotted to the stylus 120, capabilities of stylus 120, or information received from a third party device. Additional information related to the stylus may include indications of a pressed button(s) 35, tilt, identification, manufacturer, version, media access control (MAC) address, and stored configurations such as color, tip type, brush, and add-ons.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a similar manner and tracked by stylus detection engine 27.

Circuit 25, e.g. touch controller may apply mutual capacitance detection or a self-capacitance for sensing a capacitive effect due to touch (or hover) of fingertip 140 or due to touch of a writing tip 20. Typically, during mutual capacitance and self-capacitance detection, circuit 25 sends a triggering signal, e.g. pulse to one or more conductive strips 58 of digitizer sensor 50 and samples output from conductive strips 58 in response to the triggering and/or interrogation. In some embodiments, some or all of conductive strips 58 along one axis of the grid are triggered simultaneously or in a consecutive manner, and in response to each triggering, outputs from conductive strips 58 on the other axis are sampled. Typically, this procedure provides for detecting coordinates of multiple fingertips 140 touching sensor 50 at the same time (multi-touch). Circuit 25 typically includes finger detection engine 26 for managing the triggering signal, for processing the touch signal and for tracking coordinates of one or more fingertips 140.

Typically, output from circuit 25 is reported to host 22. Typically, the output provided by circuit 25 may include coordinates of one or more fingertips 140, coordinates of writing tip 20 of stylus 120, a pen-up or pen-down status of tip 20, pressure applied on tip 20 and additional information provided by stylus 120, e.g. pressure, tilt, and battery level. Typically, circuit 25 uses both analog and digital processing to process signals detected with digitizer sensor 50. Optionally, some and/or all of the functionalities of engines 26 and 27 are integrated in one or more processing units adapted for controlling operation of digitizer sensor 50. Optionally, some and/or all of the functionalities of circuit 25, engines 26 and 27 are integrated and/or included in host 22. Host 22 may transmit the information to an application manager or a relevant application. Optionally, circuit 25 and host 22 may transfer the raw information to an application. The raw information may be analyzed or used as needed by the application. At least one of stylus 120, circuit 25 and host 22 may pass on the raw information without analysis or being aware of the information.

According to some exemplary embodiments, stylus 120 additionally includes a wireless communication unit 30, e.g. an auxiliary channel with Bluetooth communication, near field communication (NFC), radio frequency (RF) communication using module 23 of host 22.

Figure 2:
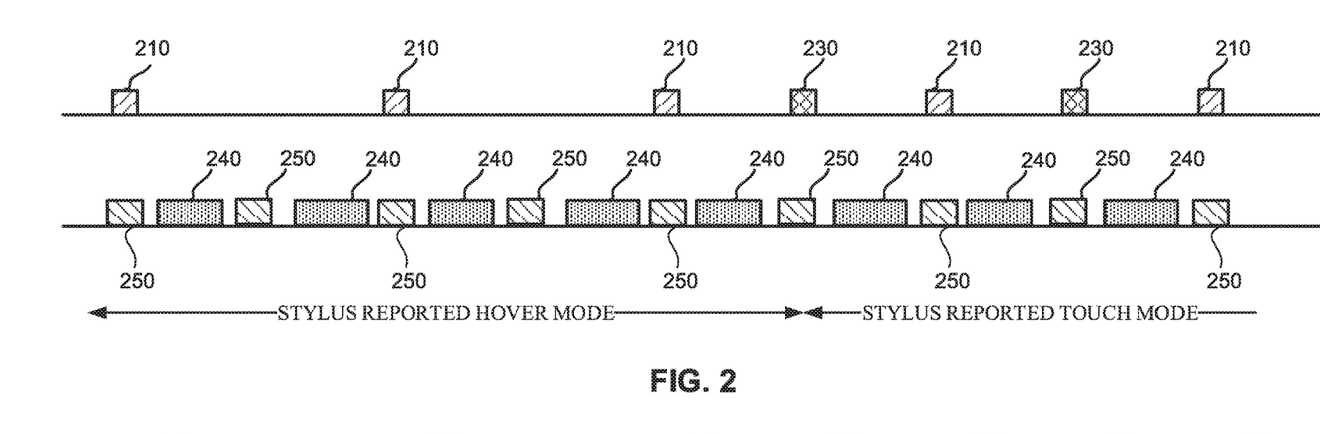
FIG. 2 is a simplified time line depicting exemplary stylus transmission periods and exemplary corresponding digitizer system sampling periods to detect both stylus and finger touch interaction in accordance with some embodiments of the present disclosure.

Reference is now made to FIG. 2 showing a simplified time line depicting exemplary stylus transmission periods and corresponding exemplary digitizer system sampling periods to detect both stylus and finger touch interaction in accordance with some embodiments of the present disclosure. In some exemplary embodiments, a digitizer system switches between sampling output to detect a stylus signal (sampling windows 250) and performing mutual capacitive detection (or self capacitive detection) to detect finger touch interaction with the digitizer sensor (sampling windows 240). Sampling windows 250 are typically defined to be in synchronization with stylus signal transmission 210 times and sampling windows 240 for mutual capacitive detection may be defined to substantially fill in time between timings of sampling windows 250. Alternatively, the stylus may synchronize its transmission times to set sampling periods of the digitizer system.

Figure 3:
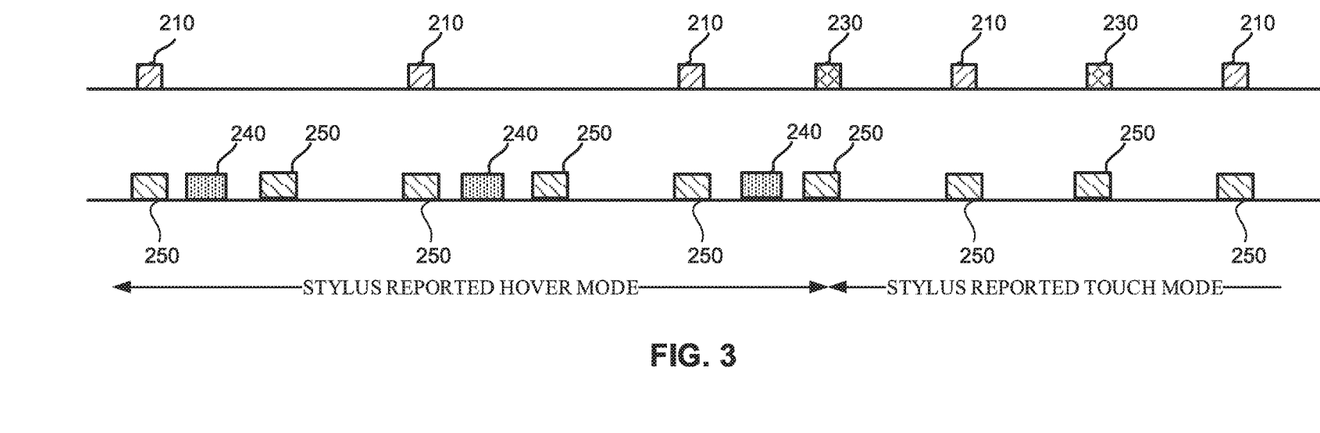
FIG. 3 is a simplified time line depicting exemplary stylus transmission periods and exemplary corresponding digitizer system sampling periods to detect only stylus interaction in accordance with some embodiments of the present disclosure.

In some exemplary embodiments, a stylus transmits a beacon signal 210 based on which location of the stylus is tracked, and may also transmit additional signals that provide information. Typically, the additional information is transmitted at set times with respect to beacon signal 210 that are known or are communicated to the digitizer system. Optionally, the stylus periodically transmits a pressure signal 230 including information on the pressure level sensed or indicating a tip status as tip touch or tip hover. For the purpose of conserving battery life in the stylus, the stylus may only transmit pressure signal 230 during a sensed touch mode and may not transmit a pressure signal during a sensed hover mode as is shown in FIG. 3. The touch mode is typically based on a defined pressure sensing threshold. The defined threshold is typically corresponds to a 15 gm of force applied on the tip. Due to the mechanical nature of pressure sensor 15 it is typically difficult to sense a force of less than 15 gm with sufficient accuracy.

According to some exemplary embodiments, soft touches below the threshold level, e.g. below 15 gm is instead detected by the digitizer system based on a mutual capacitive detection sampling period 240. While a capacitive effect of the stylus tip is detectable by mutual capacitive detection, the stylus is determined to be in a touch state and while the capacitive effect of the stylus tip not detectable by mutual capacitive detection, the stylus is determined to be in a hover state.

During mutual capacitive detection, only the output obtained in the vicinity of the stylus is required to be examined to identify a capacitive effect to the presence of stylus tip on the digitizer sensor. Location of the stylus may be determined based on output previously detected during sampling period 250.

Typically, a capacitive effect may be detected when stylus tip 20 is touching the digitizer sensing surface but may not be detected as soon as the stylus tip 20 is lifted off the digitizer sensing surface. Zero force or near zero force touch may be detected based on mutual capacitive detection since the detection is based on proximity and not pressure.

According to some exemplary embodiments, when a soft touch is detected based on mutual capacitive detection, a report is sent to the host indicating a touch mode. In some exemplary embodiments, analysis of the output to detect soft touches is only initiated while the stylus is indicating a hover mode. Optionally, soft touch detection is disabled in response to detecting a pressure signal 230 transmitted by the stylus. Although soft touch detection may be disabled, the digitizer system may continue to perform mutual capacitive detection for detecting finger touch interaction while the stylus is reporting touch mode. Optionally, an application running on a touch enabled device enables or disables soft touch detection.

Reference is now made to FIG. 3 showing a simplified time line depicting exemplary stylus transmission periods and exemplary corresponding digitizer system sampling periods to detect only stylus interaction in accordance with some embodiments of the present disclosure. In some exemplary embodiments, a digitizer system may operate in a stylus only mode in which the digitizer system track stylus input but does not track finger touch input. In such embodiments or modes, a mutual capacitive detection window 240 may only be included for the purpose of soft touch detection and may be disabled over periods in which the stylus transmits a pressure signal 230. In addition, sampling window 240 may be relatively short since only sensing lines in the vicinity of the stylus need to be scanned and sampled to identify the capacitive effect due to the stylus tip. Location of the tip may be based on output detected over sampling period 250.

Figure 4:
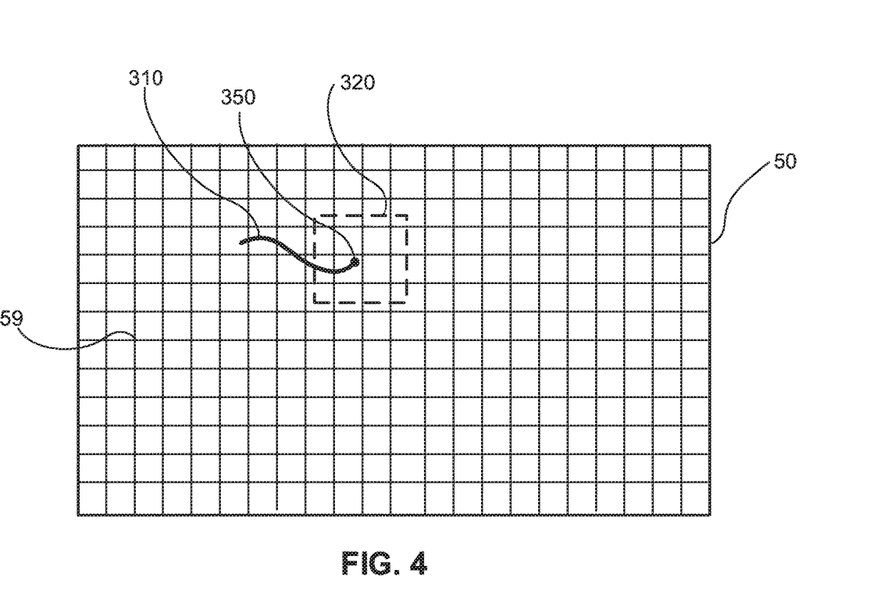
FIG. 4 is a simplified drawing of an area on a digitizer sensor selected around a location of the stylus for detecting a capacitive effect from the stylus tip in accordance with some embodiments of the present disclosure.

Reference is now made to FIG. 4 showing a simplified drawing of an area on a digitizer sensor selected around a location of the stylus for detecting a capacitive effect from the stylus tip in accordance with some embodiments of the present disclosure. According to some embodiments, soft touch of a stylus is detected based on output from predefined number of junctions 59 around the last detected location 350 of the stylus. Area 320 encompassing the predefined number of junctions 59 may be defined. Optionally, the direction of movement of the stylus (a stroke 310) is tracked and an area 320 around the last detected location of the stylus for detecting a capacitive effect is defined to be skewed toward the direction of movement. In some exemplary embodiments, outputs from at least 9 junctions around the last detected location of the stylus are examined to search for a presence of a capacitive effect of the stylus tip on digitizer sensor 50. According to some exemplary embodiments, a heap map of area 320 is analyzed by the digitizer system to detect a capacitive effect. Typically, the capacitive effect is a negative peak and is detected in the same or similar manner in which finger touches are detected.

According to some exemplary embodiments, the capacitive effect is identified determined based on the heat map for area 320 and based on a pre-defined response function relating output from a junction to distance of the conductive tip from that junction and optionally azimuth of the tip. The response function is typically determined based on measured values. Typically, maximum likelihood criteria are applied to determine probability that the tip is located at certain locations in area 320. Detection of a capacitive effect is determined when the probability that the tip is located at a certain location in area 320 is above defined threshold.

Figure 5:
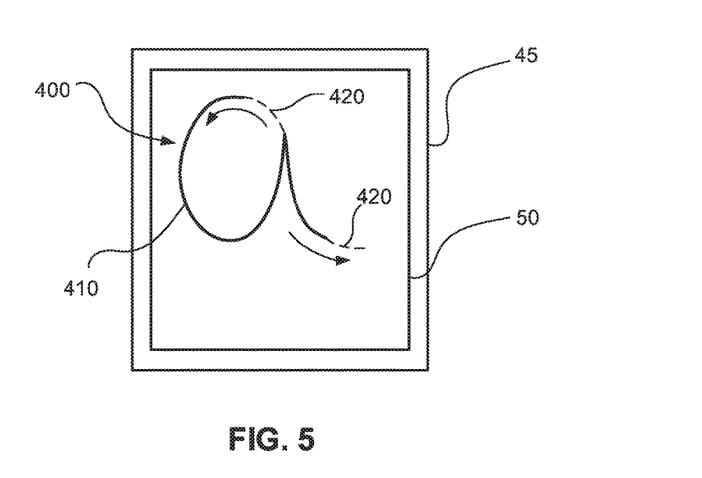
FIG. 5 is a simplified drawing showing inking based on stylus input in accordance with some embodiments of the present disclosure.

Reference is now made to FIG. 5 showing a simplified drawing showing inking based on stylus input in accordance with some embodiments of the present disclosure. According to some embodiments, soft touch detection as described herein may improve the sensitivity of inking. In some exemplary embodiments, an initial stroke 420 performed when applying little or no pressure on the writing tip may be inked even when the stylus is reporting a hover mode. The digitizer system may detect the touch based on mutual capacitive detection and report a touch mode for inking. In a same manner, a stoke 420 associated with lift off that are also typically performed with little or no pressure applied on the writing tip may also be inked. Optionally strokes 410 performed with high pressure are based on a stylus report that it is in touch mode. The stylus report may be picked up by the digitizer system or may be reported directly to the host via Bluetooth, NFC or the like.

Figure 6:
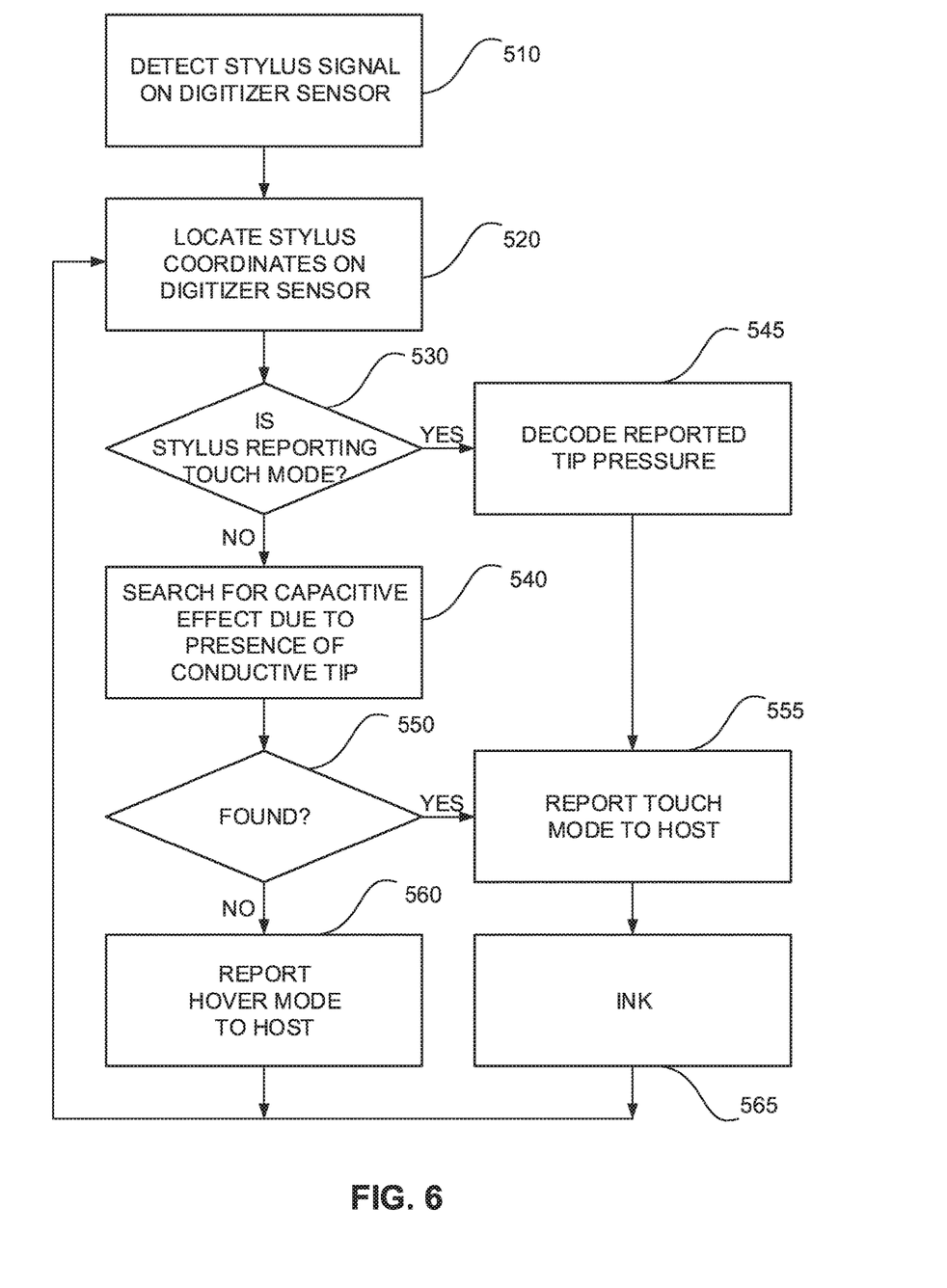
FIG. 6 is a simplified flow chart of an exemplary method for identifying a touch of a pressure sensitive stylus on a digitizer sensing surface in accordance with some embodiments of the present disclosure.

Reference is now made to FIG. 6 showing a simplified flow chart of an exemplary method for identifying a touch of a pressure sensitive stylus on a digitizer sensing surface in accordance with some embodiments of the present disclosure. During operation of a stylus enabled digitizer system, the digitizer system periodically samples output from its digitizer sensor to detect a signal emitted by a stylus (block 510). Based on the detected stylus signal, coordinates of the stylus may be determined (block 520). Typically, the stylus also reports a tip status while interacting with the digitizer system. The tip status report may be indication that the stylus tip is being pressed. Optionally, the tip status report may indicate a pressure level applied on the stylus tip. Typically, the digitizer system receives the report and monitors the tip status of the stylus. If the stylus is reporting a touch mode (block 530), the touch mode is typically reported to the host (block 555). Typically, a touch mode is an indication to display ink on a display associated with the digitizer system (block 565). Optionally, if the stylus is sending pressure level information, the information is decoded (block 545) and optionally also reported to the host. In some applications, the pressure level may be used to define the line width during inking or may be used as input to an application running on the host.

During periods when the stylus is reporting a hover mode or while the stylus in not reporting pressure (which is an indication that it is in hover mode), the digitizer system applies mutual capacitive detection to check if a capacitive effect due to the presence of the stylus tip can be identified at the location of the stylus (block 540). If the capacitive effect is identified, the stylus is determined to be in a touch mode (soft touch), and a touch mode is reported to host (block 555). Based on the report, inking may be displayed at the stylus location (block 565). If the capacitive effect is not identified at the location of the stylus, a hover mode is confirmed (block 560) and the stylus stroke is not inked. This process may be repeated for each refresh cycle of the digitizer system as long as the stylus is interacting with the digitizer system.

Figure 7:
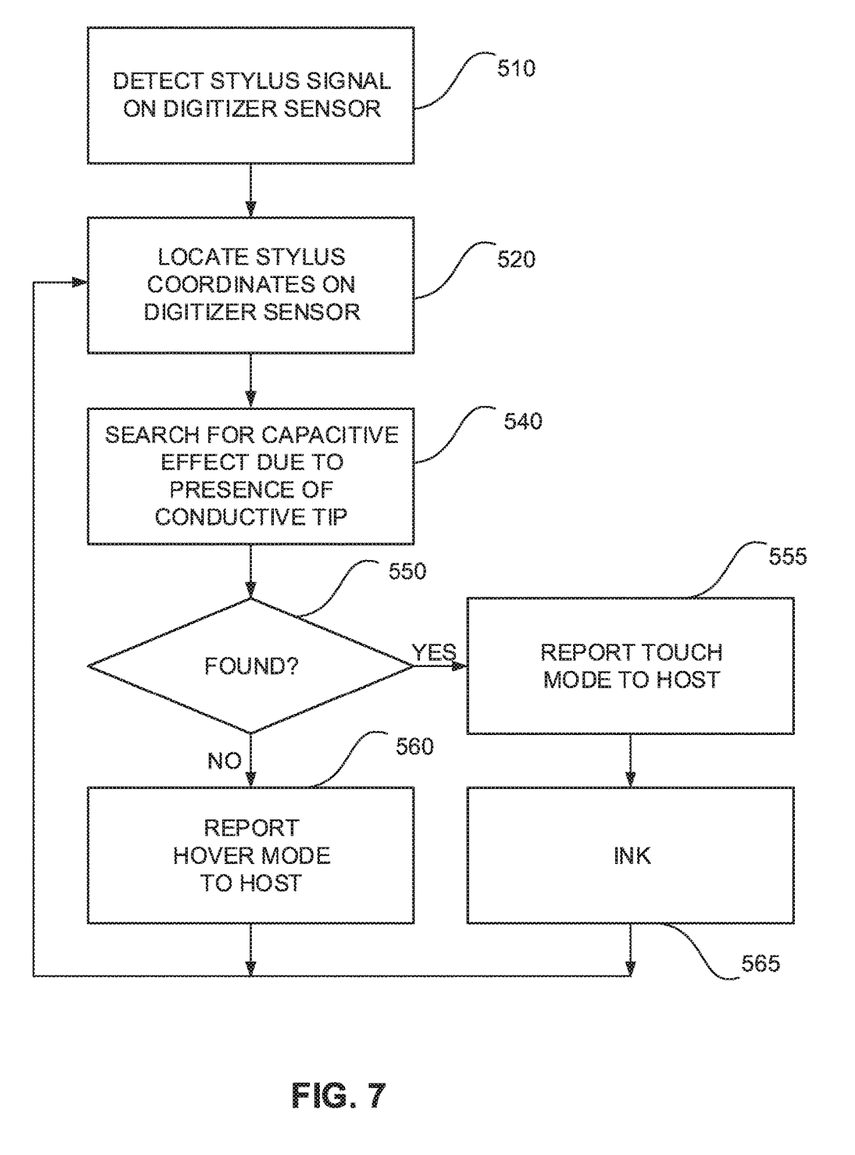
FIG. 7 is a simplified flow chart of an exemplary method for identifying a touch of a stylus on a digitizer sensing surface with a stylus that is not pressure sensitive in accordance with some embodiments of the present disclosure.

Reference is now made to FIG. 7 showing a simplified flow chart of an exemplary method for identifying a touch of a stylus on a digitizer sensing surface with a stylus that is not pressure sensitive in accordance with some embodiments of the present disclosure. The method described herein may also be applied to detecting touch with an active signal emitting stylus that is not pressure sensitive. Optionally, a mutual capacitive detection method may be used in place of reporting based on a pressure sensor embedded in the stylus.

During operation of a stylus enabled digitizer system, the digitizer system periodically samples output from its digitizer sensor to detect a signal emitted by a stylus (block 510). Based on the detected stylus signal, coordinates of the stylus may be determined (block 520). The digitizer system applies mutual capacitive detection to check if a capacitive effect due to the presence of the stylus tip can be identified at the location of the stylus (block 540). If the capacitive effect is identified, the stylus is determined to be in a touch mode (soft touch), and a touch mode is reported to host (block 555). Based on the report, inking may be displayed at the stylus location (block 565). If the capacitive effect is not identified at the location of the stylus, a hover mode is reported (block 560) and the stylus stroke is not inked. This process may be repeated for each refresh cycle of the digitizer system as long as the stylus is interacting with the digitizer system.

According to an aspect of some exemplary embodiments, there is provided a method comprising: detecting a signal emitted by a stylus with a digitizer sensor; determining coordinates of the stylus based on detecting the signal emitted; determining that the stylus is identifying a hover operational mode; detecting a capacitive effect of a tip of the stylus on the digitizer sensor based on mutual capacitive detection, wherein the detecting is performed in a defined area around the coordinates determined; reporting a touch operational mode of the stylus based on the capacitive effect detected.

Optionally, the method includes identifying the hover operational mode is identified based on output from a sensor embedded in the stylus.

Optionally, the hover operation mode of the stylus is based on the stylus sensing less than 15 gm force on the tip.

Optionally, the method includes detecting a touch operational mode with 0 to 15 gm force on the tip of the stylus based on the capacitive effect detected.

Optionally, the method includes detecting a second signal emitted by the stylus, wherein the second signal includes pressure information; identifying a touch operational mode of the stylus based on the pressure information; and reporting a touch operational mode of the stylus at the coordinates determined based on identifying the touch operational mode.

Optionally, the method includes disabling the mutual capacitive detection of the tip based on the pressure information indicating the touch operational mode.

Optionally, the second signal is detected by the digitizer sensor or a wireless communication module associated with a host computing device.

Optionally, an application running on a host computing device selectively enables identifying the touch operation mode based on mutual capacitive detection of the tip.

Optionally, the method includes detecting a heat map at least in the defined area, wherein the heat map maps output at each junction included in at least the defined area; applying a maximum likelihood cost criteria to determine probability that the capacitive effect can be detected in the defined area, wherein the maximum likelihood cost criteria is based on a pre-defined response function relating output from a junction of the digitizer sensor to location of the tip from that junction; detecting the capacitive effect based on the probability being above a defined threshold.

Optionally, detecting the capacitive effect of the tip is only performed in the defined area.

Optionally, the method includes inking based on reporting the touch operational mode of the stylus.

According to an aspect of some exemplary embodiments, there is provided a device comprising: a display; a digitizer sensor associated with a sensing surface; a circuit associated with the digitizer sensor and configured to: detect a signal emitted by a stylus with the digitizer sensor; determine coordinates of the stylus based on detecting the signal emitted; determine that the stylus is identifying a hover operational mode; detect a capacitive effect of a tip of the stylus on the digitizer sensor based on mutual capacitive detection, wherein the detecting is performed in a defined area around the coordinates determined; and report a touch operational mode of the stylus based on the capacitive effect; and a controller configured to display ink on the display based on the report of the touch operational mode.

Optionally, identifying the hover operational mode is identified based on output from a sensor embedded in the stylus.

Optionally, the circuit is configured to detect a touch operational mode with 0 to 15 gm force on the tip of the stylus based on the capacitive effect detected.

Optionally, the circuit is configured to: detect a second signal emitted by the stylus, wherein the second signal includes pressure information; identify a touch operational mode of the stylus based on the pressure information; and report a touch operational mode of the stylus at the coordinates determined based on identifying the touch operational mode.

Optionally, the circuit is configured to disable the mutual capacitive detection of the tip based on the pressure information indicating the touch operational mode.

Optionally, the device includes wireless communication module, wherein the second signal is detected by the wireless communication module.

Optionally, the circuit is configured to: detect a heat map at least in the defined area, wherein the heat map maps output at each junction included in at least the defined area; apply a maximum likelihood cost criteria to determine probability that the capacitive effect can be detected in the defined area, wherein the maximum likelihood cost criteria is based on a pre-defined response function relating output from a junction of the digitizer sensor to location of the tip from that junction; and detect the capacitive effect based on the probability being above a defined threshold.

Optionally, the circuit is configured to report a hover operational mode of the stylus at the coordinates determined based on the probability being below the defined threshold.

According to an aspect of some exemplary embodiments, there is provided a method comprising: detecting a signal emitted by a stylus with a digitizer sensor; determining coordinates of the stylus based on detecting the signal emitted; determining that the stylus is identifying a hover operational mode; detecting a capacitive effect of a tip of the stylus on the digitizer sensor based on mutual capacitive detection, wherein the detecting is performed in a defined area around the coordinates determined; reporting a touch operational mode of the stylus based on the capacitive effect; detecting a second signal emitted by the stylus; determining that the stylus is identifying a touch operational mode; disabling the detecting of the capacitive effect; and reporting a touch operational mode of the stylus.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
   detecting a stylus signal with a digitizer sensor, wherein the stylus signal is emitted by the stylus;
   determining coordinates of the stylus based on detecting the stylus signal;
   determining that the stylus is identifying a hover operational mode based on the stylus signal;
   searching for a capacitive effect of a tip of the stylus on the digitizer sensor based on mutual capacitive detection in a defined area around the coordinates determined;
   reporting a touch operational mode of the stylus based on identifying the capacitive effect; and
   reporting the hover operational mode of the stylus based on the determining that the stylus signal is indicating the hover operational mode and based on identifying a capacitive effect of the tip is not detectable in the defined area.

2. The method of claim 1, wherein the stylus is configured to identify the hover operational mode based on output from a sensor embedded in the stylus.

3. The method of claim 1, comprising detecting the touch operational mode with less than 15 gm force on the tip based on the capacitive effect.

4. The method of claim 1, comprising detecting the touch operational mode with more than 15 gm force on the tip of the stylus based on data included in the stylus signal.

5. The method of claim 1, comprising:
   detecting a second stylus signal emitted by the stylus, wherein the second stylus signal includes pressure information from a pressure sensor embedded in the stylus;
   identifying a touch operational mode of the stylus based on the pressure information; and
   reporting a touch operational mode of the stylus at the coordinates determined based on identifying the touch operational mode.

6. The method of claim 5, comprising disabling the mutual capacitive detection of the tip based on the pressure information indicating the touch operational mode.

7. The method of claim 5, wherein the second stylus signal is detected by the digitizer sensor or a wireless communication module associated with a host computing device.

8. The method of claim 1, wherein an application running on a host computing device selectively enables identifying the touch operation mode based on mutual capacitive detection of the tip.

9. The method of claim 1, comprising:
   detecting a heat map at least in the defined area, wherein the heat map maps output at each junction included in at least the defined area;
   applying a maximum likelihood cost criteria to determine probability that the capacitive effect can be detected in the defined area, wherein the maximum likelihood cost criteria is based on a pre-defined response function relating output from a junction of the digitizer sensor to location of the tip from that junction;

detecting the capacitive effect based on the probability being above a defined threshold.

10. The method of claim 1, wherein detecting the capacitive effect of the tip is only performed in the defined area.

11. The method of claim 1, comprising inking based on reporting the touch operational mode of the stylus.

12. A device comprising:
a display;
a digitizer sensor associated with a sensing surface;
a circuit associated with the digitizer sensor and configured to:
   detect a stylus signal with the digitizer sensor, wherein the stylus signal is emitted by the stylus;
   determine coordinates of the stylus based on detecting the signal emitted;
   determine that the stylus is identifying a hover operational mode based on the stylus signal;
   search for a capacitive effect of a tip of the stylus on the digitizer sensor based on mutual capacitive detection in a defined area around the coordinates determined;
   report a touch operational mode of the stylus based on identifying the capacitive effect; and
   report the hover operational mode of the stylus based on the determining that the stylus signal is indicating the hover operational mode and based on identifying a capacitive effect of the tip is not detectable in the defined area; and
a controller configured to display ink on the display based on the report of the touch operational mode.

13. The device of claim 12, wherein the data is based on output from a sensor embedded in the stylus.

14. The device of claim 12, wherein the circuit is configured to detect a touch operational mode with 0 to 15 gm force on the tip of the stylus based on the capacitive effect detected.

15. The device of claim 12, wherein the circuit is configured to configured to:
   detect a second stylus signal emitted by the stylus, wherein the second signal includes pressure information from a pressure sensor embedded in the stylus;
   identify a touch operational mode of the stylus based on the pressure information; and
   report a touch operational mode of the stylus at the coordinates determined based on identifying the touch operational mode.

16. The device of claim 15, wherein the circuit is configured to disable the mutual capacitive detection of the tip based on the pressure information indicating the touch operational mode.

17. The device of claim 15, comprising wireless communication module, wherein the second stylus signal is detected by the wireless communication module.

18. The device of claim 12, wherein the circuit is configured to:
   detect a heat map at least in the defined area, wherein the heat map maps output at each junction included in at least the defined area;
   apply a maximum likelihood cost criteria to determine probability that the capacitive effect can be detected in the defined area, wherein the maximum likelihood cost criteria is based on a pre-defined response function relating output from a junction of the digitizer sensor to location of the tip from that junction; and
   detect the capacitive effect based on the probability being above a defined threshold.

19. The device of claim 18, wherein the circuit is configured to report a hover operational mode of the stylus at the coordinates determined based on the probability being below the defined threshold.

20. A method comprising:
detecting a stylus signal with a digitizer sensor, wherein the stylus signal is emitted by the stylus; determining coordinates of the stylus based on detecting the stylus signal; determining that the stylus is identifying one of a touch operation mode and a hover operational mode based on the stylus signal; searching for a capacitive effect of a tip of the stylus on the digitizer sensor based on mutual capacitive detection in a defined area around the coordinates determined; determining that the stylus is in the touch operational mode based on: identifying the capacitive effect and based on determining that the stylus is identifying a hover operational mode; or determining that the stylus is identifying the touch operational mode; determining that the stylus is in the hover operational mode based on the determining that the stylus signal is indicating the hover operational mode and based on identifying a capacitive effect of the tip is not detectable in the defined area; and reporting one of the touch operational mode and the hover operational mode.

* * * * *